Patented May 22, 1928.

1,671,007

UNITED STATES PATENT OFFICE.

HERMAN L. BERGER, OF JERSEY CITY, NEW JERSEY.

COMPOSITION.

No Drawing.   Application filed January 19, 1927. Serial No. 162,219.

This invention relates to a composite material which radiates energy, such as electronic current when under the influence of direct or radiant heat, and which is capable of being used as a detecting and rectifying means for high frequency oscillations, and as an electrode in vacuum tubes.

The material is produced from a metal having high specific conductivity, such as silver or copper, or an alloy of these metals, with an oxysulphureted compound of elements, such as calcium, strontium, barium, and magnesium, in different combinations, or chemical divisions thereof. The desired combination of elements is used in the form of a solution or bath to treat the metal or metal alloys.

A solution, satisfactory for obtaining the results looked for may consist of 15 grams of calcium oxide, and 24 grams of sulphur, with a sufficient quantity of water to produce a solution of 100 cubic centimeters. The water is gradually added to the calcium oxide until it is thoroughly slaked, and chemical reaction has subsided. When this has taken place, the 24 grams of sulphur is intermittently mixed with it. The mixture is placed in 200 cubic centimeters of boiling water to which heat is applied, and boiling thereof is continued for approximately one hour, with frequent agitation; water being added from time to time to keep the mixture to a volume of 100 cubic centimeters. The insoluble portion of the mixture is allowed to subside, after which the clear portion is decanted. The decanted portion is then ready for use for the treatment of the metal or metal alloys used. The solution is properly prepared by using glass or porcelain lined vessels.

The oxysulphuret of calcium is heated to approximately 214° F. depending upon the concentration or density, and when it has become a darker color than the original cool solution, the metal or metal alloy, preferably silver, of the proper form and shape is immersed in the solution, and allowed to remain therein until it has acquired a surface chemical change of such density as may be required. This composite material or substance is then removed from the solution, and is worked with distilled water to remove any adhering portion of the solution, is dried, and is then ready for use.

No limitation is made to the use of the chemical combination of oxygen, calcium, sulphur and water, as similar results can be obtained with oxides of barium, strontium or magnesium, with sulphur and water. Furthermore, no limitation is made to the use of these elements singly, as they may be used in different combinations, or chemical divisions, with water. It is also to be understood that no limitation is made to the exact formula specified.

It has also been found that the vapors arising from the boiling solution of an oxysulphureted compound of the group of elements known as the alkaline earths, will produce a coating on silver sensitive to produce the result looked for. The silver is placed in close proximity to the surface of the boiling solution.

It has also been discovered that silver, when immersed into an alkaline solution of hydroxide and sulphureted hydrogen allowed to pass into the solution, a similar effect can be obtained.

Although copper may be used, or an alloy of silver and copper, silver is preferred for producing a core with a high specific conductivity which will be coated in the process with a coating of high resistance.

Although there has been described what is deemed to be the preferred embodiment of the invention, it is understood that modifications will suggest themselves to those skilled in the art, within the spirit and scope of the appended claims, and that such modifications are to be considered as embodiments of the invention.

I claim:

1. An electron emission element comprising a metallic core of comparatively high conductivity, and a coating on the core, the coating consisting of an oxysulphureted substance.

2. An electron emission element comprising a core of silver, and a coating on the core, the said coating consisting of any oxysulphureted substance.

3. An electron emission element comprising a metallic core having a comparatively high conductivity, and a coating on the core, the coating consisting of an oxysulphureted silver.

HERMAN L. BERGER.